United States Patent
Hendrix

[11] 3,887,923
[45] June 3, 1975

[54] RADIO-FREQUENCY HOLOGRAPHY

[75] Inventor: Charles E. Hendrix, Pacific Palisades, Calif.

[73] Assignee: The United States of America as represented by the Secretary of the Navy, Washington, D.C.

[22] Filed: June 26, 1973

[21] Appl. No.: 372,431

[52] U.S. Cl................ 343/113 R; 340/5 H; 343/17
[51] Int. Cl............................ G01s 7/04; G01s 5/02
[58] Field of Search........... 343/17, 113 R; 340/5 H, 340/5 MP; 350/3.5

[56] References Cited
UNITED STATES PATENTS

| | | | |
|---|---|---|---|
| 3,631,384 | 12/1971 | Smith, Jr. | 350/3.5 X |
| 3,680,041 | 7/1972 | Smith, Jr. | 340/15.5 DP |
| 3,717,843 | 2/1973 | Farrah et al. | 343/17 X |
| 3,719,922 | 3/1973 | Lopes, Jr. et al. | 340/5 MP |
| 3,760,344 | 9/1973 | Hildebrand | 340/5 H |

Primary Examiner—Maynard R. Wilbur
Assistant Examiner—G. E. Montone
Attorney, Agent, or Firm—R. S. Sciascia; Roy Miller; Robert F. Beers

[57] ABSTRACT

A passive radio direction finder monitors wavefronts across an aperture, produces a radio-frequency hologram, and numerically reconstructs the hologram. The direction finder consists of an array of antennas to sample the phase of incoming wavefronts, a plurality of mixers separately connected to individual antennas, a phase lock loop or bandpass limiter connected between any individual antenna and an input of each mixer to provide a mixer reference signal, a multi-channel analog to digital converter attached to the output of each mixer, and a digital computer programmed to make fast Fourier transform calculations. In lieu of the plurality of antennas and mixers, a moving probe antenna and single mixer may be used if a sample and hold circuit is added to the phase lock circuit to provide a reference signal.

1 Claim, 2 Drawing Figures

RADIO-FREQUENCY HOLOGRAPHY

BACKGROUND OF THE INVENTION

1. Field of the Invention

This invention pertains to direction finding with radiofrequency holography.

2. Description of the Prior Art

An optical hologram can be thought of as a recording of the instantaneous phase and amplitude of a wavefront of light. Usually, the wavefront will be that which has been scattered from some object whose image is to be recorded. Recording is done on a photographic emulsion, which is not normally sensitive to phase. Recording of phase is made possible, however, by the addition of a reference wave, coherent with the object wave, and which interferes with it, producing diffraction patterns which are recorded on the photographic emulsion and which become the hologram.

After development, the photograph of the diffraction pattern can be used to reconstruct the original object wavefront. The hologram is illuminated by the reference wave in the same geometrical relationship as that used in the original recording. The photographic interference pattern scatters the reference wave, and it is readily shown that the scattered wave will be a replica of the original wavefront which was scattered by the object. Since the two wavefronts are identical, the reproduced wavefront looks to the eye as if the object were still present.

The ideas of holography can be directly applied to the radio-frequency domain and utilized for direction finding. No direct analog of the photographic emulsion exists at radio frequencies, of course, but it is possible to measure and record phase across an aperture. The simplest way to do this is to sample the phase at discrete points within the aperture, using an array of antenna elements. If the elements are spaced sufficiently close in the array, an unambiguous determination of the direction of arrival (which is equivalent to recording the holographic image of a distant point source) can be obtained.

Just as in the optical case, it is necessary to provide a reference signal in order to measure relative phase at the sampling points within the aperture. In "active" systems, in which an object is illuminated by a transmitter signal and it is the return which is to be monitored, the reference signal can be derived from the transmitter. This is the direct radio-frequency analog of the optical case where an object is illuminated by a coherent light source, and the light scattered by the object is recorded in the hologram. In most radio direction-finding applications, however, the object is the emitter of energy, and the receiver is entirely passive. In this case, it is necessary to derive the reference signal from the received signal itself.

Reconstruction

While reconstruction of radio-frequency holograms can be performed optically, yielding a visible image that was originally recorded at radio wavelengths, the technical problems which are involved are considerable.

SUMMARY OF THE INVENTION

A passive radio direction finder monitors wavefronts across an aperture, produces a radio-frequency hologram, and numerically reconstructs the hologram. The direction finder consists of an array of antennas to sample the phase of incoming wavefronts, a plurality of mixers separately connected to individual antennas, a phase lock loop or bandpass limiter connected between any individual antenna and an input of each mixer to provide a mixer reference signal, a multi-channel analog to digital converter attached to the output of each mixer, and a digital computer programmed to make fast Fourier transform calculations. In lieu of the plurality of antennas and mixers, a moving probe antenna and single mixer may be used if a sample and hold circuit is added to the phase lock circuit to provide a reference signal.

DESCRIPTION OF THE PREFERRED EMBODIMENT

Figure 1:
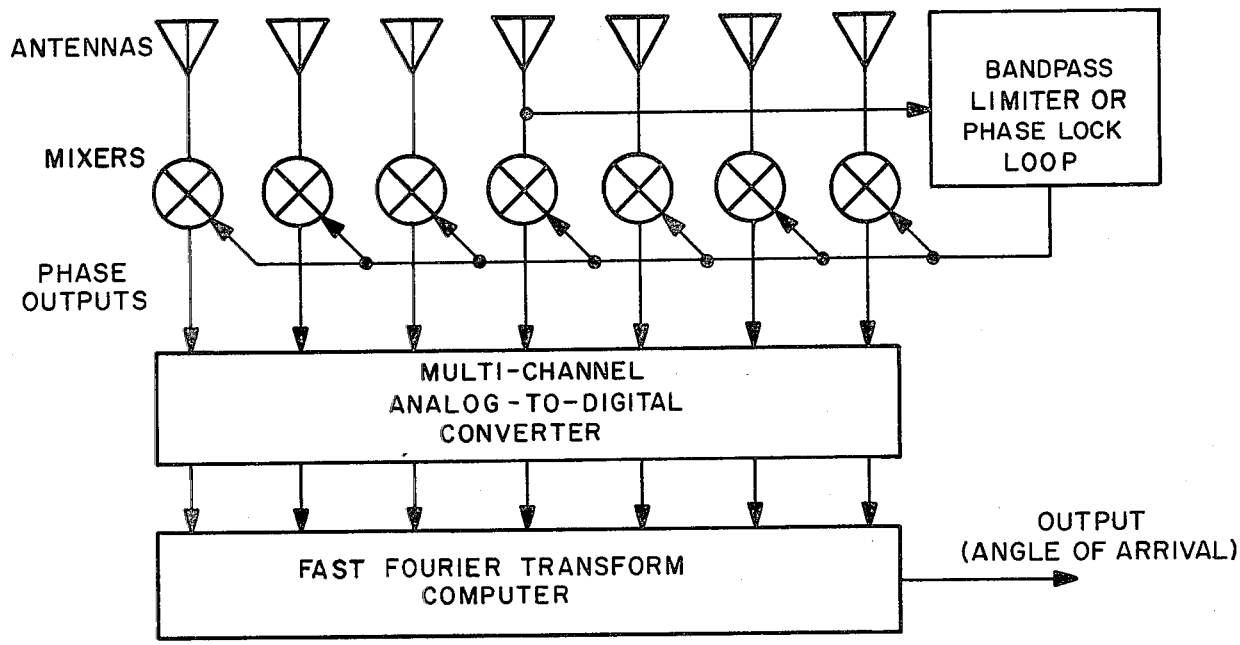
FIG. 1 shows a one-dimensional holographic receiver with computational reconstruction in block diagram form.

The simplest approach to radio-frequency holography is that illustrated in FIG. 1. The incoming wavefronts are received by an array of antennas. The array may either be one-dimensional (as shown) or two-dimensional. Since the only measurement which is required is relative phase across the aperture, the signal from any one of the elements can be used for the reference. This signal is amplified, limited, filtered to remove extraneous components, and used as a local oscillator signal for each of the remaining elements. Since both inputs to the mixer will be at the same frequency, each element constitutes a "homodyne" or "zero-frequency IF" receiver. The output of each mixer is a steady voltage which is proportional to the relative phase at that element.

An easier method of reconstruction is a numerical one. In the output of the array shown in FIG. 1, the phase measurements have already been reduced to numerical values. It is natural, therefore, to attempt to find a numerical reconstruction.

The optical reconstruction of a holographic image amounts to diffraction of the reference wave by the hologram. Diffraction of a plane wave, normally incident upon an aperture, can be described by the following equation.

$$F(\alpha, \beta) = \int_0^{D_x} \int_0^{D_y} A(x, y) e^{j(K \sin \alpha)x} e^{j(K \sin \beta)y} dx\, dy \quad (1)$$

where $\alpha$ and $\beta$ = the angles into which the light is scattered $A(x, y)$ = the transmission of the scatterer (in this case, the hologram)

$D_x$ and $D_y$ = the linear dimensions of the aperture (hologram) $K = 2\pi/\lambda$, the spatial frequency of the illumination.

By defining $K \sin \alpha$ and $K \sin \beta$ as a single variables, the integral of Equation (1) can be recognized as a two-dimensional finite Fourier transform. As such, it is readily calculable with modern computing methods. For example, recently developed fast Fourier transform techniques could be used to give near real-time readouts of a changing pattern of incident radiation. See Cochrane, W. T., et al, "What is the Fast Fourier Transform?" Proc. IEEE, 55, (1664–1677), 1967.

A possible mechanization of this kind of system is depicted in block diagram form in FIG. 1. The individual phase information, which consists of a dc voltage, is converted to digital form in an analog-to-digital converter and then enters a fast Fourier transform computation. The output from this computation will be the angles of arrival of any signals within the passband of the receiver. In this sense, the system represents a rather general radio direction finder.

Moving Probe Holography

Figure 2:
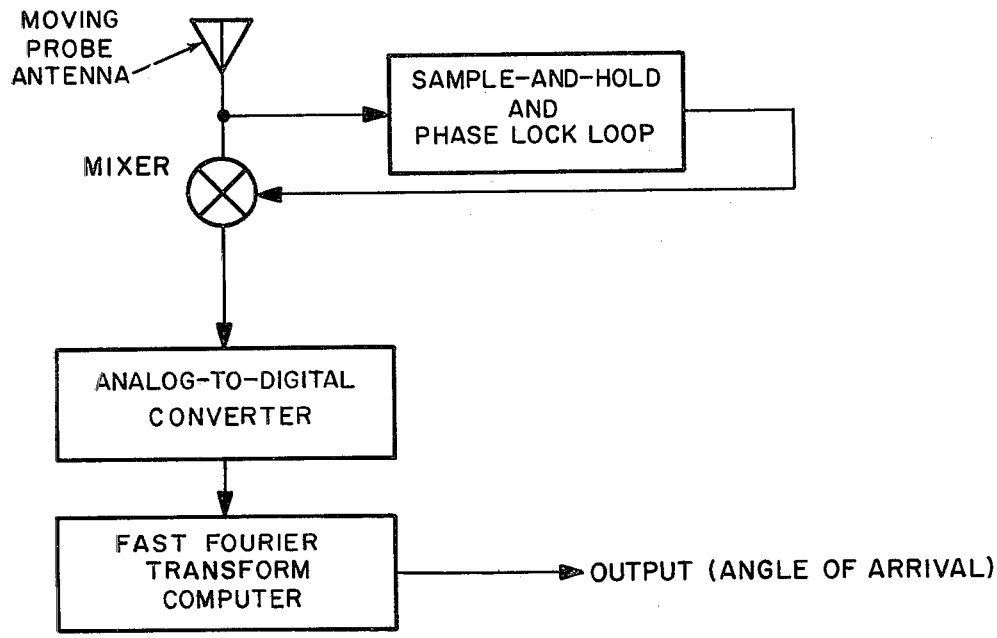
FIG. 2 shows a moving probe holographic receiver in block diagram form.

Some experiments on radio-frequency holography have relied upon mapping the electromagnetic field with a moving probe, as shown in FIG. 2 which is used to scan over the aperture, rather than using multiple receiving elements as outlined in the previous section. See Deschamps, G. A., "Some Remarks on Radio-Frequency Holography," Proc. IEEE, 55, (570–571), 1967. This system will work as long as the field distribution remains constant during the time of scan.

One possible application of moving probe holography is in radio direction-finding from a moving aircraft. The resolution which can be obtained in the direction of motion can be considerable since the "aperture" in this direction corresponds to the distance flown during the observation. Direction finding in the lateral direction, perpendicular to the flight path would be limited to use of a fixed one-dimensional array such as described in the previous section. Since the dimension of such an array will be limited by the size of the aircraft, the resolution in this dimension will be poorer than that in the direction parallel to the flight path.

The problem of generating a suitable reference for moving probe holography is not simple. The received signal cannot be used directly, for it is precisely the phase changes in received signal which are to be measured. One possible system would proceed in two steps—the first step being a precise measurement, or "lock-on" to received signal and the second step being a holding of this frequency for use as a reference. A phase-lock loop with "sample-and-hold" capabilities could perform this task.

In the moving probe case, the information which forms the hologram becomes available as a function of time, a new "fringe" being obtained each time the probe moves through one wavelength as measured along the flight path. Therefore, the entire hologram is not available at a given instant but must be recorded prior to reconstruction. The reconstruction equation must be rewritten to take into account the fact that the data are being received as a function of time.

The reconstruction equation for a one-dimensional, moving probe hologram is given by $$F(\alpha, t) = \frac{1}{D} \int_{x=vt}^{x=vt+D} A(x) e^{j(K \sin \alpha)x} dx \quad (2)$$

Both the upper and lower limits are changing with time at velocity v, which is proportional to the velocity at which the probe moves. Implementation of Equation (2) would involve recording the hologram information, then reading it out at intervals into a Fourier transform computation. A complete recomputation would have to be done each time the limits have moved significantly.

A more readily mechanizable approach would be to let the lower limit remain fixed while the upper one moves, resulting in an effective aperture which grows with time. Such a system will start out with very poor angular resolution, but will continuously improve it as the aperture size increases. The diffraction equation in this case is $$F(\alpha, t) = \frac{1}{vt} \int_{x=0}^{x=vt} A(x) e^{j(K \sin \alpha)x} dx \quad (3)$$

Examination of Equation (3) reveals that all computation will take place at the upper limit, that there is no need for a recording medium. FIG. 2 is a block diagram of a moving probe system using this latter approach.

Multi-Target Capability

Optical holograms are capable of handling many different arrival angles (extended targets), but all wavefronts which arrive at the photographic plate are coherent and, therefore, at precisely the same frequency. In the radio-frequency case, this situation is very unlikely to occur. The individual targets will be independent emitters; and, even though they are nearly the same frequency, they will never be coherent.

There is, however, a certain frequency tolerance which a holographic system will permit. This is evidenced in the optical domain by reconstruction of holographic images using white light. See Wilmont, D. W., E. R. Schineller, R. W. Herman, "Hologram Illumination With a Flash Light," Proc IEEE, 54, (690–691), 1966. Two signals (one of which may be the reference) which are nearly the same frequency will produce "interference fringes" in the hologram aperture. The presence of such fringes will give an erroneous result upon reconstruction. Error criteria which define the "bandwidth" of a radio frequency hologram will depend upon permitting some maximum number of interference fringes in the aperture, usually no more than one-half fringe.

It should be pointed out that while the bandwidth defined in this manner is relatively small, it is entirely possible to record a number of radio-frequency holograms simultaneously as long as they are separated in frequency and a proper reference is provided for each. Therefore, holographic systems have an inherently multi-target capability if target frequencies are either widely spaced (with multiple reference trackers) or if they are closely spaced (with a single reference tracker).

What is claimed is:

1. passive passave radio direction finder for producing a radio frequency hologram and numerically reconstructing the hologram said finder comprising;

a plurality of fixed antenna elements closely spaced to form a linear array having a predetermined receiving aperture for individually sampling the phase of an incoming wave front at discrete points across the receiving aperture;

a plurality of mixer elements each separately electrically coupled to each of said antenna elements for receiving individual electrical signals;

self contained reference signal means electrically coupled to receive a signal from one of said antenna elements and electrically coupled to each of said mixer elements for providing a signal output that is the same frequency as the signal received by each of said antenna elements;

a multi-channel analog-to-digital converter electrically coupled to each of said mixer elements for receiving direct current signal voltages from said mixer elements that are proportional to the relative phase of an incoming wave front as it impinges each of said antenna elements and to provide an output that is a digital representative of each direct current voltage; and a fast Fourier transform digital computer coupled to said converter for transforming each signal received by each of said antenna elements into a signal representative of the angles of arrival as an incoming wave front impinges said antenna elements;

whereby a radio-frequency hologram is constructed that is indicative of the direction of the target from said direction-finder.

* * * * *